United States Patent [19]

De Vos

[11] Patent Number: 5,391,584
[45] Date of Patent: * Feb. 21, 1995

[54] MANUFACTURE OF RIGID FOAMS AND COMPOSITIONS THEREFOR

[75] Inventor: Rik De Vos, Rotselaar, Belgium

[73] Assignee: Imperial Chemical Industries PLC, London, England

[*] Notice: The portion of the term of this patent subsequent to Aug. 24, 2010 has been disclaimed.

[21] Appl. No.: 27,533

[22] Filed: Mar. 8, 1993

Related U.S. Application Data

[63] Continuation-in-part of Ser. No. 974,353, Nov. 10, 1992, Pat. No. 5,238,970, which is a continuation of Ser. No. 852,071, Mar. 16, 1992, abandoned.

[30] Foreign Application Priority Data

| Apr. 3, 1991 | [GB] | United Kingdom | 9106967 |
| Jun. 12, 1991 | [GB] | United Kingdom | 9112622 |
| Aug. 16, 1991 | [GB] | United Kingdom | 9117749 |
| Nov. 1, 1991 | [GB] | United Kingdom | 9123205 |

[51] Int. Cl.⁶ ............................................. C08G 18/14
[52] U.S. Cl. .................................... 521/114; 521/121; 521/129; 521/131; 521/132
[58] Field of Search ............... 521/131, 132, 114, 121, 521/129

[56] References Cited

U.S. PATENT DOCUMENTS

| 5,162,384 | 11/1992 | Owens et al. | |
| 5,210,106 | 5/1993 | Dams et al. | 521/110 |
| 5,211,873 | 5/1993 | Dams et al. | 252/182.24 |
| 5,286,759 | 2/1994 | Smits et al. | 521/131 |

FOREIGN PATENT DOCUMENTS

| 0355713 | 2/1990 | European Pat. Off. |
| 0405439 | 1/1991 | European Pat. Off. |
| 0300743 | 1/1991 | Japan |
| 3000743 | 1/1991 | Japan |
| 3000744 | 1/1991 | Japan |
| 3000745 | 1/1991 | Japan |
| 3000746 | 1/1991 | Japan |
| 1589562 | 5/1981 | United Kingdom |
| 2225030 | 6/1990 | United Kingdom |
| 2226030 | 6/1990 | United Kingdom |

Primary Examiner—Morton Foelak
Attorney, Agent, or Firm—Cushman Darby & Cushman

[57] ABSTRACT

The use of a liquid for the preparation of a rigid polyurethane and/or polyisocyanurate foam by reacting a polyisocyanate and a polyol in the presence of a blowing agent characterised in that the liquid is an inert, insoluble, non-blowing liquid. CFC-free foams may be obtained showing good insulating properties.

10 Claims, No Drawings

MANUFACTURE OF RIGID FOAMS AND COMPOSITIONS THEREFOR

This application is a continuation-in-part of Ser. No. 07/974,353, filed Nov. 10, 1992, now U.S. Pat. No. 5,238,970, a continuation of Ser. No. 07/852,071, filed Mar. 16, 1992, now abandoned.

The present invention is concerned with a novel polyisocyanate composition, a novel polyol composition, a novel process for preparing a rigid polyurethane and/or polyisocyanurate foam and the use of a special class of liquids in preparing such foams.

Rigid foams in general are made by reacting an appropriate polyisocyanate and polyol in the presence of a blowing agent. One of the blowing agents most widely used has been trichloro-fluoromethane (CFC-11) due to its favourable combination of properties; in particular its insulating capacity makes CFC-11 suitable for use in rigid foams which are to be used in refrigerators and buildings in order to provide a better degree of insulation.

Recently it was found that chlorofluorocarbon blowing agents, like CFC-11, might deplete the ozone layer around the earth. Because of this concern it was agreed internationally to aim at phasing out the production and use of such ozone depleting compounds as soon as possible. Therefore there is a need to find an alternative which on the one hand is environmentally more acceptable and which on the other hand does not influence the properties of such foam in a negative way.

Surprisingly, we have found that by using a special class of liquids in preparing foamed material, a material may be obtained having improved insulating properties.

Consequently, the present invention is concerned with the use of a liquid for the preparation of a rigid polyurethane and/or polyisocyanurate foam by reacting a polyisocyanate and a polyol in the presence of a blowing agent characterised in that the liquid is an inert, insoluble, non-blowing liquid.

The inert, insoluble, non-blowing liquid can be combined with the polyisocyanate and/or with the polyol before the polyisocyanate and the polyol are combined to form the foam. Therefore the present invention is further concerned with a polyisocyanate composition comprising a liquid as defined above and with a polyol composition comprising a liquid as defined above. Still further the invention is concerned with a process for preparing a polyurethane and/or polyisocyanurate rigid foam by reacting a polyisocyanate and a polyol in the presence of a blowing agent and a liquid as defined above.

"Inert" as used before and hereinafter is defined as "showing no reactivity towards the other ingredients of the foam formulation, and especially towards polyols and polyisocyanates, under storage- and foam-forming conditions".

"Insoluble" as used before and hereinafter is defined as "showing a solubility in polyol and polyisocyanate of less than 500 ppm by weight at 25° C. and 1 bar".

"Liquid" as used before and hereinafter means "liquid under foam forming and preferably at ambient conditions".

"Non-blowing" as used before and hereinafter is defined as "the absence of a contribution to a density reduction". Whether or not a liquid is "non-blowing" for a certain reaction system can be tested by plotting the density against the amount of liquid used. If the density does not decrease with increasing amounts of liquid than the liquid concerned is considered as non-blowing.

Inert, insoluble liquids should be non-blowing. Whether or not a certain compound is non-blowing depends on the specific reaction conditions.

Preferably the inert, insoluble, non-blowing liquids will have a boiling point of at least 60° C., preferably at least 75° C. although some lower boiling liquids may show no blowing under certain reaction conditions.

The inert, insoluble, non-blowing liquid may be selected from fluorinated organic compounds and preferably is selected from the group consisting of fluorinated hydrocarbons, fluorinated ethers, fluorinated tertiary amines, fluorinated amino-ethers and fluorinated sulfones.

"A fluorinated compound" as mentioned above and hereinafter is defined as "a compound wherein at least 75% and preferably at least 90% and most preferably at least 99% of the hydrogen atoms have been replaced by fluorine atoms. This definition as used herein is only related to fluorinated inert, insoluble, non-blowing liquids.

The fluorinated hydrocarbons in general have at least 7 carbon atoms. They may be cyclic or non-cyclic, aromatic or aliphatic and saturated or unsaturated. Examples of fluorinated hydrocarbons are the fluorinated versions of norbornadiene, decaline, dimethylcyclohexane, methylcyclohexane, 1-methyl decaline, phenantrene, heptane, octane, nonane and cyclooctane.

The fluorinated ethers may be cyclic or acyclic and include for instance fluorinated propyltetrahydrofuran and fluorinated butyltetrahydrofuran. Suitable commercially available fluorinated ethers include Galden HT 100, HT 200, HT 230, HT 250 and HT 270 all from Montefluos SpA (Galden is a trade mark) which are fluorinated polyethers.

The fluorinated amines include the fluorinated versions of trimethylamine, triethylamine, ethyldimethylamine, methyl diethylamine, tripropylamine, tributylamine, tripentylamine, N-alkylpiperidines like N-methylpiperidine.

Examples of fluorinated sulfones are $CF_3SO_2CF_3$ and $CF_3SO_2CF_2CF_3$.

Examples of suitable fluorinated amino ethers include fluorinated N-alkyl($C_{2-6}$)morpholine like N-ethyl- and N-isopropyl-morpholine. Mixtures of inert, insoluble, non-blowing liquids may be used as well.

The inert, insoluble, non-blowing liquids should be liquid under foam-forming conditions and preferably are liquid at ambient conditions. Hence, in principle solids may be used provided they become liquid while the reaction is taking place.

Fluorinated and perfluorinated compounds have been proposed in the prior art as an ingredient for preparing foams. U.S. Pat. No. 4,972,002 discloses the use of low boiling fluorinated hydrocarbons for preparing foams. The compounds are used as blowing agents. EP 405439 is disclosing the use of perfluorinated ethers and hydrocarbons as inflating agents for preparing rigid foams. Again the fluorinated compounds are used as blowing agents. U.S. Pat. No. 4,981,879 discloses the use of perfluorinated hydrocarbons having a boiling point of less than 215° C. and preferably less than 105° C.; the use of a non-blowing fluorinated compound together with a blowing agent having a low boiling point or together with a fluorinated surfactant has not been disclosed.

The inert, insoluble, non-blowing liquid generally is used in an amount of 0.05-10 parts by weight (pbw) per 100 pbw of polyisocyanate or per 100 pbw of polyol. The amount on the whole foam forming reaction mixture in general will be 0.02-5 pbw per 100 pbw of foam forming reaction system. Preferably the amount on the whole foam forming reaction mixture is in the range of 0.1-0.5 pbw per 100 pbw of foam forming reaction system and more preferably in the range of 0.2-0.4 pbw per 100 pbw of foam forming reaction system.

Even with such low amounts of inert, insoluble non-blowing liquids good thermal insulation properties are obtained. Especially when fluorinated inert, insoluble non-blowing liquids are used these low amounts are preferred due to the Green House Warming Potential of fluorinated compounds and due to their relatively high cost price.

Before the polyisocyanate and the polyol are combined the inert, insoluble, non-blowing liquid is combined with the polyol and/or the polyisocyanate using the above indicated amount. The combining is conducted under high shear mixing conditions. Alternatively the inert, insoluble, non-blowing liquid is supplied to the foam forming mixture independently from the polyol and the polyisocyanate.

The reaction between the polyol and the polyisocyanate is conducted in the presence of a blowing agent. The blowing agent preferably is combined with the polyisocyanate or the polyol before they are combined to form the foam. Therefore the present invention is also concerned with polyisocyanate and polyol compositions comprising an inert, insoluble, non-blowing liquid and a blowing agent. Alternatively the blowing agent is supplied to the foam forming mixture in admixture with the polyol while the inert, insoluble, non-blowing liquid is supplied to the foam forming mixture together with the polyisocyanate or the other way around. Further the blowing agent can be supplied to the foam forming mixture independently from the polyisocyanate and the polyol but together with the inert, insoluble, non-blowing liquid.

The amount of blowing agent used will depend on the type of blowing agent and on the desired density and can be determined easily by those skilled in the art. In general the amount of blowing agent will be 1-20 pbw per 100 pbw of reaction system and preferably 8-15 pbw; this includes physical blowing agent and water. The amount of blowing agent in the polyisocyanate and the polyol may range from 2-50 pbw per 100 pbw of polyisocyanate or polyol with the proviso that no water is added to the polyisocyanate.

In principle every blowing agent known in the art may be used. Of course preferably no CFC blowing agent is used. Blowing agents may be selected from hydrocarbons, dialkyl ethers, hydrofluorocarbons, hydrochlorofluorocarbons like $CH_3CFCl_2$ and fluorine-containing ethers. Blowing agents having a boiling point between $-70°$ C. and $0°$ C. are preferred since it has been found that the combined use of the inert, insoluble, non-blowing liquid with such a blowing agent provides for superior foams. The foams show smaller cells, improved insulation (initial lambda-value as well as aged lambda-value) and a reduced number of so called "chimneys". An additional advantage is that a higher amount of such blowing agents can be used which further enhances the insulating properties of the foams.

Very suitably the blowing agent may be selected amongst the group consisting of $CHClF_2$, $CH_2F_2$, $CF_3CH_2F$, $CF_2HCF_2H$, $CH_3CClF_2$, $C_2H_4F_2$, $C_2HF_5$, $C_2HClF_4$ and mixtures thereof. These blowing agents having a boiling point between $-70°$ C. and $0°$ C. may be used together with water. Preferably no further blowing agents are used. Another preferred blowing agent is water alone.

As mentioned before the inert, insoluble, non-blowing liquid preferably is combined with the polyisocyanate and/or the polyol. In order to stabilise this combination to a certain degree it is preferred to employ a surfactant in order to obtain an emulsion of this inert, insoluble, non-blowing liquid in the polyisocyanate and/or the polyol.

Most preferred surfactants are fluorinated surfactants. Examples of such surfactants are fluorinated alkylpolyoxyethylene ethanols, alkylalkoxylates and alkylesters. Examples of useful fluorinated surfactants which are commercially available are Fluorad FC 430 and FC 431 from 3M; Forafac 1110D, 1157, 1157N and 1199D from Atochem and Fluowet S 3690, OTN and CD from Hoechst.

In view of the above the present invention is also concerned with a polyisocyanate and a polyol composition comprising an inert, insoluble, non-blowing liquid and a surfactant, preferably a fluorinated surfactant.

The amount of surfactant used is 0.02-5 pbw per 100 pbw of foam forming reaction system and 0.05-10 pbw per 100 pbw of polyisocyanate or polyol.

The inert, insoluble, non-blowing liquid, the blowing agent and optionally the surfactant are used in the preparation of a rigid polyisocyanate and/or polyisocyanurate foam by reacting a polyisocyanate and a polyol in the presence of the inert, insoluble, non-blowing liquid, the blowing agent and optionally the surfactant. The polyisocyanates and polyols for preparing such rigid foams are widely known.

Polyisocyanates which may be used according to the present invention include aliphatic, cycloaliphatic, araliphatic and aromatic polyisocyanates as proposed in the literature for use in the production of rigid foams. Of particular importance are aromatic diisocyanates such as tolylene and diphenylmethane diisocyanate in the well known pure, modified and crude forms, in particular the so-called MDI variants (diphenylmethane diisocyanate modified by the introduction of urethane, allophanate, urea, biuret, carbodiimide, uretonimine or isocyanurate residues) and the mixtures of diphenylmethane diisocyanate(s) and oligomers thereof known in the art as "crude" or "polymeric" MDI (polymethylene polyphenylene polyisocyanates). Preferred polyisocyanates are those having an average nominal functionality of 2.4-3.0 and in particular of 2.4-2.9.

Polyols or polyol mixtures used for preparing rigid foams in general have average hydroxyl numbers of from 300 to 1000, especially from 300 to 700 mg KOH/g, and hydroxyl functionalities of from 2 to 8, especially from 3 to 8.

Suitable polyols have been fully described in the prior art and include reaction products of alkylene oxides, for example ethylene oxide and/or propylene oxide, with initiators containing from 2 to 8 active hydrogen atoms per molecule. Suitable initiators include polyols, for example glycerol, trimethylolpropane, triethanolamine, pentaerythritol, sorbitol and sucrose, and polyamines, for example ethylene diamine, tolylene diamine, diaminodiphenylmethane and polymethylene polyphenylene polyamines, and aminoalcohols, for example ethanolamine and diethanolamine, and mixtures of such initiators. Other suitable polymeric polyols include polyesters obtained by the condensation of appropriate proportions of glycols and higher functionality polyols with dicarboxylic or polycarboxylic acids.

Still further suitable polymeric polyols include hydroxyl terminated polythioethers, polyamides, polyesteramides, polycarbonates, polyacetals, polyolefins and polysiloxanes.

In addition to the polyisocyanate, the polyol component, the blowing agent, the inert, insoluble, non-blowing liquid and the surfactant the foam-forming reaction mixture will commonly contain one or more other auxiliaries or additives conventional to rigid foam formulations. Such optional additives include crosslinking agents, for example low molecular weight polyols such as triethanolamine, foam-stabilising agents for example siloxane-oxyalkylene copolymers, urethane catalysts, for example tin compounds such as stannous octoats or dibutyltin dilaurate or tertiary amines such as dimethylcyclohexylamine or triethylene diamine, and fire retardants, for example halogenated alkyl phosphates such as tris chloropropyl phosphate.

Polyurethanes may be prepared according to the invention at an isocyanate index (ratio of isocyanate groups to isocyanate-reactive groups expressed as a percentage) between 40 and 300, preferably between 70 and 190, more preferably between 95 to 120, although higher indices, for example up to 1500, may be employed in conjunction with trimerisation catalysts.

In operating the method of the invention, the known one-shot, prepolymer or semi-prepolymer techniques may be used together with conventional mixing methods and the foams may be produced in the form of slabstock, mouldings, cavity fillings, sprayed foam, frothed foam or laminates with other materials such as hardboard, plasterboard, paper, plastics or metals.

Rigid foams prepared in accordance with the method of the invention are characterised by having a very fine cell structure and superior thermal insulation properties.

EXAMPLE 1

A polyol composition was prepared by mixing the following components (parts by weight): 100 pbw of a polyether polyol[1] blend; 33.5 pbw of $CHClF_2$; 2.0 pbw of $H_2O$; 1 pbw of dimethyl cyclohexyl amine (catalyst); 0.2 pbw of Niax A1 (an amine catalyst from Union Carbide); 2 pbw of Tegostab B 8423 (a silicone surfactant from Goldschmidt).

A polyol emulsion was prepared by mixing under high shear conditions 100 pbw of the above prepared polyol composition and 4 pbw of a mixture of perfluoro-tri-N-butylamine[2]/fluorosurfactant FC430 obtainable from 3M (in a weight ratio 3/2).

185 pbw of Suprasec[3] DNR polyisocyanate (from ICI PLC)—was reacted with this polyol emulsion. A rigid polyurethane foam was obtained.

The properties of the foam were as follows: density (kg/m[3]): 24; cell size: fine; lambda value (initial, at 10° C., mW/m° K.): 18.0 and lambda value (after 3 weeks, at 70° C., mW/m° K.): 22.5.

1) a polyol blend of functionality 3.2 and $OH_v$ 400.
2) an inert, insoluble, non-blowing liquid
3) Suprasec is a trademark of Imperial Chemical Industries PLC

EXAMPLE 2

Polyol compositions were prepared by mixing the following components (parts by weight):

|  | Polyol composition | | | |
|---|---|---|---|---|
|  | 2a | 2b | 2c | 2d |
| Polyether polyol blend of average $OH_v$ of 400[1] | 100 | 100 | 100 | 100 |
| $CHClF_2$ | 12.5 | 22.1 | 33.5 | — |
| $CHClF_2/C_2H_3ClF_2$ (40%/60% by weight) | — | — | — | 25 |
| $H_2O$ | 4 | 0.5 | 0.2 | 0.5 |
| Dimethyl cyclohexyl amine (catalyst) | 1 | 1 | 1 | 1 |
| Niax A1 (an amine catalyst form Union Carbide) | 0.2 | 0.2 | 0.2 | 0.2 |
| Tegostab B 8423 (a silicone surfactant from Goldschmidt) | 2 | 2 | 2 | 2 |

[1] same as in Example 1

Isocyanate emulsions were prepared by emulsifying, under high shear mixing conditions, the following components (parts by weight):

|  | Polyisocyanate emulsion | | | |
|---|---|---|---|---|
|  | 2a | 2b | 2c | 2d |
| Polymeric MDI (Suprasec DNR polyisocyanate from ICI) | 185 | 140 | 130 | 135 |
| Mixture of perfluoro-butylfuranl[1]/fluorosurfactant FC 431 (from 3M) (weight ratio 3/2) | 4 | 4 | 4 | 4 |

[1] an inert, insoluble, non-blowing liquid

Rigid polyurethane foams were prepared by reacting the above polyol compositions and polyisocyanate emulsions.

A rigid polyurethane foam was prepared by reacting the above polyol composition 2a with 185 parts by weight of Suprasec DNR polyisocyanate as comparative example.

The polyol and polyisocyanate used and the properties of the resulting foams are as stated in the table herebelow. The results clearly indicate improved lambda values and fine cell structures for the rigid foams prepared according to the present invention.

TABLE

|  | Comparative Example | I | II | III | IV |
|---|---|---|---|---|---|
| Polyol composition | 2a | 2a | 2b | 2c | 2d |
| Polymeric MDI (parts by weight) | 185 |  |  |  |  |
| Polyisocyanate emulsion | — | 2a | 2b | 2c | 2d |
| Density (Kg/m[3]) | 24 | 24 | 29 | 27 | 26 |
| Cell size | standard | fine | fine | fine | fine |
| lambda value (mW/m °K.) (initial, at 10° C.) | 20.8 | 19.0 | 17.1 | 16.4 | 16.3 |
| lambda value (mW/m °K.) (after 3 weeks, at 70° C.) | 29.1 | 23.2 | 21.9 | 21.1 | 20.5 |

EXAMPLE 3

Example 1 was repeated with different ingredients and amounts. The details regarding ingredients and the amounts used in as far as they deviate from example 1 as well as the physical properties of the foams are given in the following Table.

TABLE 3

| | | | | | |
|---|---|---|---|---|---|
| FC 430 (A fluorsurfactant from 3M) | 4 | 4 | 4 | 4 | 4 |
| H₂O | 5.28 | 5.28 | 5.28 | 5.28 | 5.28 |
| Perfluorodecaline | 5 | — | — | — | — |
| Perfluoropropylfuran | — | 5 | — | — | — |
| Perfluorotripropylamine | — | — | 5 | — | — |
| Perfluorobutylfuran | — | — | — | 5 | — |
| Perfluoromethylcyclohexane | — | — | — | — | 5 |
| Suprasec DNR | 187.5 | 187.5 | 187.5 | 187.5 | 187.5 |
| Density (kg/m³) | 25.9 | 24.9 | 27.9 | 25.6 | 26.6 |

EXAMPLE 4

Example 1 was repeated with different ingredients and amounts. The details regarding ingredients and the amounts used in as far as they deviate from example 1 as well as the physical properties of the foams are given in the following Table.

TABLE 4

| | | | | | | | | | | | | | |
|---|---|---|---|---|---|---|---|---|---|---|---|---|---|
| Water | 2.4 | 2.4 | 1.0 | 0.5 | 0.5 | 0.5 | 0.5 | 0.5 | 0.5 | 0.5 | 0.5 | 0.5 | 0.5 |
| CHClF₂ | 10.7 | 10.7 | 17.4 | 32.5 | 40.5 | 32.5 | 32.5 | 32.5 | 32.5 | 32.5 | 32.5 | 32.5 | 32.5 |
| Suprosec DNR | 153 | 153 | 142 | 130 | 125 | 130 | 130 | 130 | 130 | 130 | 130 | 130 | 130 |
| FC 75²⁾ | 3 | 3 | 3 | 3 | 1 | | | | | | | | |
| FC 43²⁾ | | | | | | 1 | 1 | | | | | | |
| FC 70²⁾ | | | | | | | | 1 | | | | | |
| Galden HT-230³⁾ | | | | | | | | | 1 | | | | 2 |
| Galden HT-270³⁾ | | | | | | | | | | 1 | | | |
| L 10106²⁾ | | | | | | | | | | | 1 | | |
| String time, sec | 30 | 29 | 29 | 28 | 32 | 31 | 30 | 31 | 29 | 31 | 30 | — | — |
| End of rise, sec | 45 | 48 | 47 | 39 | 41 | 45 | 48 | 41 | 42 | 43 | 45 | — | — |
| Free rise density, Kg/m³ | 26.6 | 28.1 | 28.3 | 29.1 | 29.6 | 29.3 | 29.5 | 26.3 | 25.5 | 29.0 | 27.9 | — | — |
| Lambda value (initial, at 10° C., mW/m °K.) | 20.0 | 19.4 | 18.4 | 17.3 | 16.4 | 18.0 | 17.7 | 18.8 | 19.0 | 19.3 | 18.8 | 19.5 | 19.5 |
| Cell size | normal | fine | fine | fine | fine | fine | fine | fine | fine | fine | fine | fine | fine |

¹⁾The polyol used was a polyol blend of functionality 3.1 and OH, 440 mg KOH/g
²⁾inert, insoluble, non-blowing liquid obatinable from 3M
³⁾inert, insoluble, non-blowing liquid obatinable from Monteflous

EXAMPLE 5

Example 1 was repeated with different ingredients and amounts. The details regarding ingredients and the amounts used in as far as they deviate from example 1 as well as the physical properties of the foams are given in the following Table.

TABLE 5

| | | | | |
|---|---|---|---|---|
| FC 430 | — | 1 | — | 1 |
| H₂O | 0.5 | 0.5 | 0.5 | 0.5 |
| HCFC 22/HCFC 142b | 36.3 | 36.3 | — | — |
| (40/60 w/w) | | | | |
| HPC 134a | — | — | 37.5 | 37.5 |
| FC 75 | — | 1 | — | 1 |
| Suprasec DNR | 130 | 130 | 130 | 130 |
| String time, sec | 28 | 29 | 31 | 30 |
| end of rise time, sec | 47 | 48 | 45 | 46 |
| free rise density, kg/m³ | 27.6 | 28.0 | 29.1 | 28.9 |
| initial lambda value, (at 10°C., mW/m °K.) | 19.5 | 17.3 | 21.1 | 19.6 | same polyol as in Example 4

EXAMPLE 6

Example 1 was repeated with different ingredients and amounts. The details regarding ingredients and the amounts used in as far as they deviate from example 1 as well as the physical properties of the foams are given in the following Table.

TABLE 6

| | | | | | | | | | |
|---|---|---|---|---|---|---|---|---|---|
| Perfluoropentane | 3 | | | | | | | | |
| FC 84 | | 3 | | | | | | | |
| FC 75 | | | 3 | | | | | | |
| FC 43 | | | | 3 | | | | | |
| FC 70 | | | | | 3 | | | | |
| Galden NT 230 | | | | | | 3 | | | |
| Galden NT 270 | | | | | | | 3 | | |
| Galden HT 100 | | | | | | | | 3 | |
| cream time, sec | 7 | 8 | 8 | 8 | 8 | 8 | 8 | 8 | |
| string time sec | 30 | 31 | 30 | 31 | 31 | 30 | 30 | 31 | 31 |
| free rise density, kg/m³ | 33.0 | 32.7 | 31.8 | 32.0 | 27.3 | 30.3 | collaps | collaps | 31.0 |
| initial lambda value, (at 10° C., mW/m °K.) | 15.8 | 17.7 | 18.3 | 31.8* | 32.4* | 31.3* | — | — | 18.1 |

- Polyol used was a polyol blend having a functionality of 2.75 and OH, of 400
- All formulations contained 0.5 pbw of H₂O, 35 pbw of CFC-11, 130 pbw of Suprasec DNR
*foams with high open cell content

EXAMPLE 7

Example 1 was repeated with different ingredients and amounts. The details regarding ingredients and the amounts used in as far as they deviate from example 1 as well as the physical properties of the foams are given in the following Table.

TABLE 7

| | | | | |
|---|---|---|---|---|
| water | 0.5 | 0.5 | 0.5 | 0.5 |
| CHClF₂ | 32.5 | 32.5 | 32.5 | 32.5 |
| Suprasec DNR | 130 | 130 | 130 | 130 |
| Perfluoropentane | 2 | | | |
| Perfluorinated-methylmorpholine | | 2 | | |
| FC 84¹⁾ | | | 2 | |

TABLE 7-continued

| Lambda value (initial, at 10° C., mW/m °K.) | 19.5 | 19.4 | 18.7 | 19.5 |
|---|---|---|---|---|

[1]FC 84: an inert, insoluble, non-blowing liquid obtainable from 3M under the tradename Fluorinert.

The examples elegantly show the surprising findings of the present invention.

When using the inert, insoluble, non-blowing liquid together with CFC-11 no improvement regarding insulating properties was obtainable; the lambda value even deteriorates.

When using the inert, insoluble, non-blowing liquid together with a blowing agent having a boiling point below 0° C. or together with water as the sole blowing agent surprising improvements regarding insulating properties were obtained. In this respect it is also noteworthy that the best lambda values obtained according to the present invention are better than those obtained with currently commercially available CFC-11 reduced systems which show an initial lambda value (at 10° C., mW/m° K.) of 18.9–19.2.

EXAMPLE 8

Example 1 was repeated with different ingredients and amounts. The details regarding ingredients and the amounts used in as far as they deviate from example 1 as well as the physical properties of the foams are given in the following Table.

TABLE 8

| water | 0.5 | 0.5 | 0.5 |
|---|---|---|---|
| CHClF$_2$ | 40.5 | 40.5 | 40.5 |
| Suprasec DNR | 125 | 125 | 125 |
| FC75 | 1 | 0.8 | 0.6 |
| Free Rise Density (kg/m$^3$) | 29.6 | 30.2 | 29.3 |
| Lambda value (initial at 10°C., mW/m °K.) | 16.4 | 16.8 | 17.3 |
| Cell size | fine | fine | fine |

This example shows that even with very low amounts of inert, insoluble, non-blowing liquid improvements in thermal insulation were obtained.

I claim:

1. In a method for the preparation of a rigid polyurethane and/or polyisocyanurate foam by reacting a polyisocyanate and a polyol in the presence of a blowing agent, the improvement wherein a fluorinated inert, insoluble, non-blowing liquid is also present during the reaction, said fluorinated inert, insoluble, non-blowing liquid being present in the amount of 0.1–0.5 parts by weight per 100 parts by weight of reaction system and being selected from the group consisting of fluorinated hydrocarbons, fluorinated ethers, fluorinated tertiary amines, fluorinated amino-ethers and fluorinated sulfones.

2. Method according to claim 1 wherein a blowing agent is used which has a boiling point between −70° C. and 0° C. at 1 bar.

3. Method according to claim 1 wherein a blowing agent is used which is selected amongst the group consisting of CHClF$_2$, CH$_2$F$_2$, CF$_3$CH$_2$F, CF$_2$HCF$_2$H, CH$_3$CClF$_2$, C$_2$H$_4$F$_2$, C$_2$HF$_5$, C$_2$HClF$_4$ and mixtures thereof.

4. Method according to claim 1 wherein the blowing agent is water.

5. Method according to claim 1 wherein the inert, insoluble, non-blowing liquid is selected from the group consisting of fluorinated ethers and fluorinated amino-ethers.

6. Method according to claim 1 wherein a surfactant is also used.

7. Method according to claim 6 wherein the surfactant is a fluorinated surfactant.

8. Method according to claim 1 wherein the amount of blowing agent is 1–20 parts by weight per 100 parts by weight of reaction system.

9. Method according to claim 6 wherein the amount of surfactant is 0.02–5 parts by weight per 100 parts by weight of reaction system.

10. Method according to claim 1 wherein the amount of inert, insoluble, non-blowing liquid is 0.02–5 parts by weight per 100 parts by weight of reaction system.

* * * * *